Patented Mar. 20, 1951

2,546,101

UNITED STATES PATENT OFFICE 2,546,101

METHOD OF ENSILING VEGETABLE PRODUCTS

Kornelis Pleunis Kalis, Voorburg, Netherlands, assignor of one-half to N. V. Matepa, Maatschappij tot Exploiteeren van Octrooien en Licenties, 's-Hertogenbosch, the Netherlands, a corporation of the Netherlands No Drawing. Application December 27, 1948, Serial No. 67,580. In the Netherlands January 2, 1948

2 Claims. (Cl. 99—8)

This invention relates to the ensilage of vegetable products which are to undergo the usual lactic fermentation.

In the ensilage of bulky products one encounters the great difficulty that the mass, before having settled, encloses large quantities of air, which results in the lactic fermentation proceeding unevenly and in the concomitant losses of sugar which is not converted into lactic acid.

By adding large quantities of liquid the air is driven out of the mass from the beginning and use has already been made, therefore, of this principle in order to improve the ensilage, while as a rule the surface of the liquid is covered with a layer of oil.

It is also known to use an already acid liquid for the ensilage which liquid immediately brings the mass to a lower pH-value, which promotes the uniform course of the lactic fermentation.

Quite apart from the use of these known measures it takes long to fill the silo so far that it can be covered.

The object of this invention is to effect an improvement therein. To that end large quantities of acidified liquid are supplied according to the invention during the period of filling a silo only and are periodically removed during said period in order to effect the settling of the vegetable mass to be preserved.

The application of the method according to the invention causes the bulky vegetable mass to settle very quickly as soon as the liquid is removed. An acid liquid in particular, results in the vegetable tissues dying off rapidly, so that after removal of the acid liquid the mass, settles to a considerable extent e. g. in 24 hours when treating young grass.

The following is an example of practising the method:

A silo is half filled with young grass and so much acid liquid having a pH of about 3.9 is added that the mass is submerged. After 24 hours the liquid is pumped out and the grass is trod down, which rapidly settles then and encloses only little air. In this manner the volume of young grass is in 24 hours reduced to approximately a third of the original volume on filling. Grass is again brought into the silo now and acid liquid is added, which after 24 hours is pumped out again, whereupon the newly introduced grass is trod down. In this manner a silo can be entirely filled in e. g. 6 days and thereupon it can be covered with the usual layer of earth after the acid liquid has been definitively removed.

This filling method offers the great advantage that a capping piece need not be used and that the layer of earth which is ultimately put on, practically will not settle any more.

The acid liquid which is pumped out of the silo, must again have a pH of about 3.9 before being added anew, which can be achieved by the addition of some sugar or some mineral acid. The sugar is rapidly converted into lactic acid. The amounts of sugar and/or acid required for this purpose, are exceedingly small, because the mass to be ensiled yields a biologically acidified liquid itself, which is sufficient for its preservation, because by excluding the air from the very beginning and by immediately reducing the pH the lactic fermentation proceeds so uniformly that the amount of sugar contained in the vegetable mass is substantially completely converted into lactic acid. The acid liquid, therefore, is occasionally adjusted somewhat by means of small amounts of acid or sugar in the form of e. g. molasses and can be kept for months on end under a layer of oil, whereupon it can again be utilized during a subsequent ensiling period. The method, therefore, uses only very small amounts of introduced auxiliary materials.

I claim:

1. A method of ensiling vegetable products, which comprises maintaining the said products completely submerged in an acid liquid in a silo during the period immediately after filling of the latter and while the products have not yet settled, and periodically pumping out said acid liquid in order to give the vegetable products present in the silo an opportunity to settle solely by their own weight.

2. A method according to claim 1, wherein a further mass of vegetable products is periodically added, and acid liquid is again introduced into the silo in amount to keep the freshly added mass completely submerged therein.

KORNELIS PLEUNIS KALIS.

REFERENCES CITED

The following references are of record in the file of this patent:

UNITED STATES PATENTS

| Number | Name | Date |
|---|---|---|
| 280,352 | Colcord | July 3, 1883 |
| 1,257,754 | Sonderegger | Feb. 26, 1918 |
| 1,551,427 | Pfister | Aug. 25, 1925 |
| 2,054,026 | Steindorff et al. | Sept. 8, 1936 |

FOREIGN PATENTS

| Number | Country | Date |
|---|---|---|
| 6,023 | Australia | of 1932 |
| 371,036 | Great Britain | of 1932 |
| 468,940 | Great Britain | of 1937 |
| 481,998 | Great Britain | of 1938 |